UNITED STATES PATENT OFFICE.

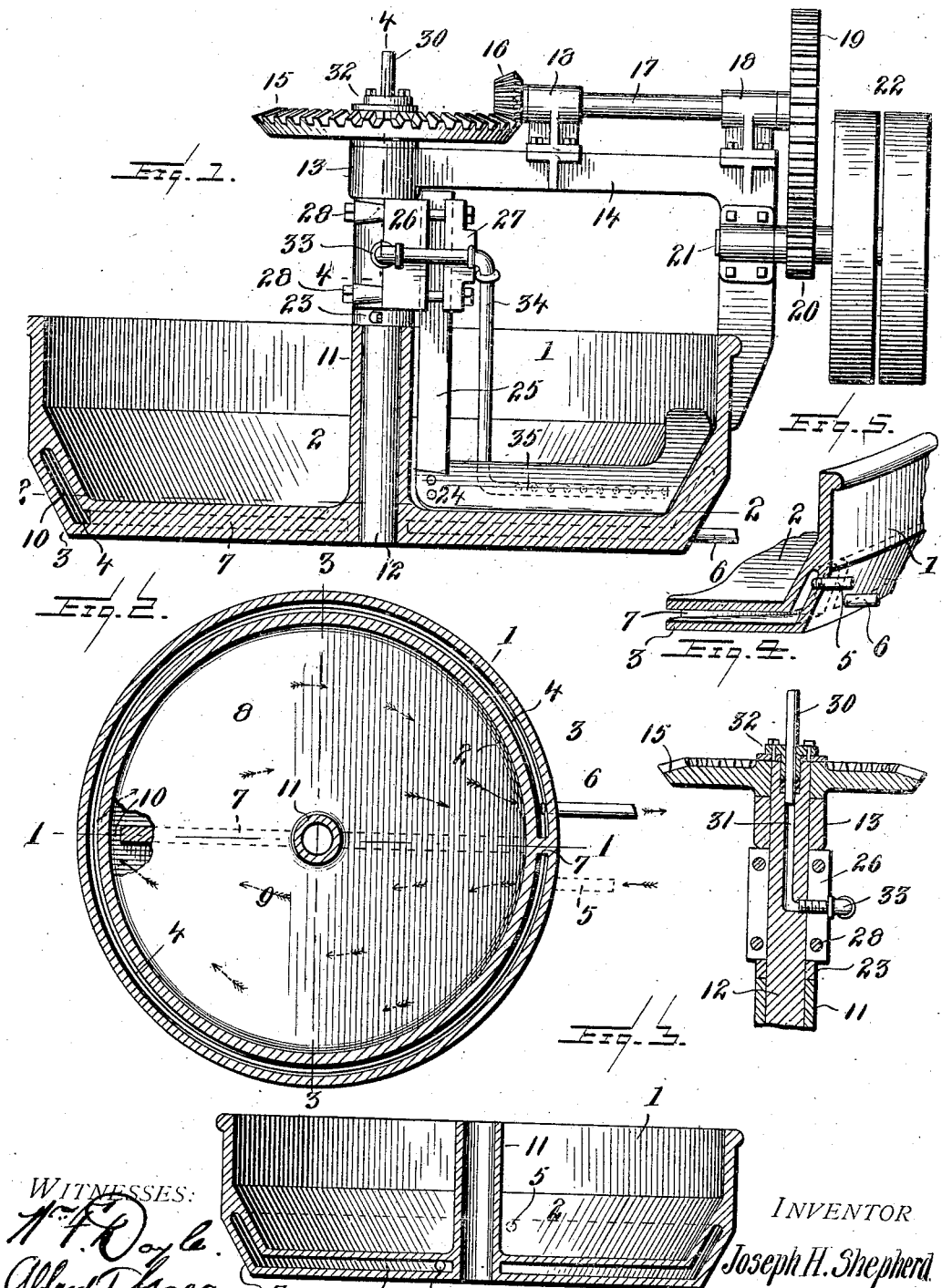

JOSEPH H. SHEPHERD, OF DOVER, NEW JERSEY, ASSIGNOR TO THE MORRIS COUNTY MACHINE & IRON COMPANY, OF DOVER, NEW JERSEY, A CORPORATION OF NEW JERSEY.

MIXING-MACHINE.

No. 845,438.        Specification of Letters Patent.        Patented Feb. 26, 1907.

Application filed November 16, 1906. Serial No. 343,750.

*To all whom it may concern:*

Be it known that I, JOSEPH H. SHEPHERD, a citizen of the United States, residing at Dover, in the county of Morris, State of New Jersey, have invented certain new and useful Improvements in Mixing-Machines, of which the following is a specification, reference being had therein to the accompanying drawings.

This invention relates to a mixing-machine, and particularly to an apparatus of that character wherein the material to be mixed is to be heated or cooled during or subsequent to the mixing operation.

The invention has for an object to provide a novel and improved construction of the jacket for heating or cooling the mixing-pan by providing therein one or more partitions whereby a circulation therethrough is maintained, so that a uniform temperature throughout the entire space at the bottom of the pan is secured in the least possible time.

A further object of the invention is to provide a novel and improved clamping device for fastening upon the main shaft the scraper used in connection with the pan, whereby it may be quickly and readily adjusted.

Other and further objects and advantages of the invention will be hereinafter set forth and the novel features thereof defined by the appended claims.

In the drawing, Figure 1 is a vertical section through the pan on the line 1 1, Fig. 2, with the driving-gears in elevation. Fig. 2 is a horizontal section on the line 2 2, Fig. 1. Fig. 3 is a vertical section on the line 3 3, Fig. 2. Fig. 4 is a detail section on the line 4 4, Fig. 1; and Fig. 5 is a sectional perspective of the pipe connections.

Like numerals refer to like parts in the several figures of the drawings.

The numeral 1 designates the pan or kettle, which may be of any desired size or configuration, preferably provided with an inwardly-tapering portion 2 at its base, which is separated from the bottom or outer wall 3 of the pan by means of the space 4, into which either a heating or cooling medium may be introduced for the purpose of maintaining the desired temperature in the material to be mixed. This space is provided at one side with an inlet connection 5 and an outlet 6, communicating with the space 4 and disposed at opposite sides of the partition 7. This space 4 beneath the bottom of the pan is divided by one or more of the partitions 7 into a plurality of chambers, the first of communicates with the inlet connection and the last with the outlet connection. For instance, as shown in Figs. 1, 2, and 5, the partition divides the space 4 into the chambers 8 and 9 and terminates at one end, so as to leave a communicating passage 10 between these chambers. This results in the circulation of the heating or cooling medium introduced in the chamber 9 through the same and outward through the chamber 8, thus effectually expelling the air in these chambers, and prevents the trapping of the air, which occurs in the ordinary disposition of the space beneath the pan where both inlet and outlet connections communicate with the same chamber. The pan is provided at its center with the post 11, in which the main shaft 12 for the stirrer is mounted, and, as shown in Figs. 1 and 4, this shaft is supported at its upper portion by a bearing 13, carried by an arm 14, extending over the pan and supported from the outer wall thereof. Above this bearing the driving-gear 15 is keyed upon the shaft and meshes with the beveled pinion 16, carried upon the shaft 17, which is mounted in bearings 18 upon the arms 14. The outer end of the shaft 17 is provided with the gear 19, meshing with the pinion 20, secured upon the shaft 21, which carries the usual loose and fast pulleys 22 for imparting power to the driving mechanism. The shaft 12 is also supported against downward movement in the post 11 by means of the collar 23, secured to the shaft. The stirrer or mixing-blade 24, which traverses the bottom of the pan, is provided with the attaching-arm 25, extended vertically therefrom and secured to the shaft 12 to rotate therewith by means of the clamping-block 26, mounted on the shaft and provided with the coöperating plate 27, embracing the arm 25 and carrying the bolts 28, which when properly adjusted clamp both the arm and block in position.

In the operation of the machine it is frequently desirable to introduce a fluid or liquid during the mixing operation, and this may be accomplished by means of the feed-pipe 30, which communicates through a passage 31 within the upper end of the shaft 12 and is connected thereto by means of the stuffing-box 32, disposed upon the upper face of the gear 15. The lower end of this passage receives the pipe connection 33, which extends, by means of the conducting-pipe 34, to the perforated discharge-nozzle 35, disposed at the rear of the stirrer-blade 24, as shown by dotted lines in Fig. 1. This blade and pipe rotate with the shaft and provide for the continuous introduction of any material which it may be desired to admix with that already within the pan.

The operation of the invention will be fully understood from the foregoing description; but it will be observed that the use of one or more partitions provides a plurality of chambers which control the circulation of the heating or cooling medium through the space within the pan, so that the temperature desired is immediately secured and the trapping of any air entirely avoided. An important item in the mixing operation is the saving of time in heating the pan and the ability to maintain at all points therein a uniform temperature by means of the partitions and chambers. It will also be seen that the clamping device for the stirrer-blade permits an adjustment or renewal thereof in the quickest possible time and avoids the difficulty heretofore encountered by corrosion of the securing means for the blade.

Having described my invention and set forth its merits, what I claim, and desire to secure by Letters Patent, is—

1. In a mixing-machine, a pan provided with a horizontally-disposed space entirely beneath its bottom, and a diametrically-disposed partition traversing said space to form a plurality of chambers and having an opening therein to effect communication between said chambers.

2. In a mixing-machine, a pan provided with a horizontally-disposed space entirely beneath its bottom, a diametrically-disposed partition traversing said space to form a plurality of chambers and having an opening therein to effect communication between said chambers, an inlet connection for the first of said chambers, and an outlet connection for the last of said chambers disposed on the same side of the machine as the inlet connection.

3. In a mixing-machine, a pan provided with a space within the bottom thereof, a diametrically-disposed partition extending for a portion of the width of the pan to form a plurality of chambers and having an opening at one end to effect communication between said chambers, an inlet connection communicating with the first of said chambers, an outlet connection communicating with the last of said chambers, a centrally-disposed post, a driving-shaft mounted therein, and a stirrer-blade carried by said shaft to traverse the bottom of the pan above said space.

4. In a mixing-machine, a pan provided with a space extending entirely beneath the bottom thereof, a partition transversely disposed within said space and having an opening at one end to control the circulation therethrough, and inlet and outlet connections at the same side of the pan communicating with the space at opposite sides of the partition.

5. In a mixing-machine, a pan provided with a space between the sides and bottom thereof, a partition extending transversely from the top of the side space at one side of the pan to the bottom of the side space at the opposite side of the pan and provided with an opening to form communicating chambers, an inlet connection communicating with the first of said chambers, and an outlet connection communicating with the last of said chambers.

6. In a mixing-machine, a pan, a driving-shaft mounted therein, a scraper-blade disposed within the pan and provided with a securing-arm, a recessed clamping-block secured to the shaft to embrace one face of said arm, and a recessed plate to embrace the opposite face of the arm and secured to said block.

In testimony whereof I affix my signature in presence of two witnesses.

JOSEPH H. SHEPHERD.

Witnesses:
W. G. MITZ,
LYMAN M. SMITH.